United States Patent
Dietrich et al.

Patent Number: 6,079,525
Date of Patent: Jun. 27, 2000

[54] BRAKE UNIT CONSISTING OF A BRAKE DISK AND A BRAKE LINING

[75] Inventors: Gerd Dietrich, Burgrieden; Gerhard Gross, Boebingen; Tilmann Haug, Uhldingen-Muehlhof; Kolja Rebstock, Ulm, all of Germany

[73] Assignee: DaimlerChrysler AG, Germany

[21] Appl. No.: 09/106,219

[22] Filed: Jun. 29, 1998

[30] Foreign Application Priority Data

Jun. 28, 1997 [DE] Germany .......................... 197 27 586

[51] Int. Cl.⁷ .......................... F16D 69/02; C04B 35/565
[52] U.S. Cl. .................... 188/251 A; 428/212; 428/218; 428/408; 428/698
[58] Field of Search ................ 188/251 A, 255; 428/212, 218, 408, 698

[56] References Cited

U.S. PATENT DOCUMENTS 5,007,508  4/1991  Lacombe .

FOREIGN PATENT DOCUMENTS

| | | |
|---|---|---|
| 0 300 756 A1 | 1/1989 | European Pat. Off. . |
| 0 515 193 A2 | 11/1992 | European Pat. Off. . |
| 0 835 853 A1 | 4/1998 | European Pat. Off. . |
| 44 38 455 C1 | 5/1996 | Germany . |
| 44 38 456 A1 | 5/1996 | Germany . |
| 197 11 829 | 3/1997 | Germany . |

*Primary Examiner*—Deborah Jones
*Assistant Examiner*—Jason Savage
*Attorney, Agent, or Firm*—Evenson, McKeown, Edwards & Lenahan, P.L.L.C.

[57] ABSTRACT

A brake unit includes a brake disk made of a fiber-reinforced ceramic C/SiC composite and a brake lining tribologically interacting with this brake disk. The brake lining comprises the same material as the brake disk, in which case, at least in the area of the brake lining close to the surface, the hardness is lower than that of the brake disk. The brake unit exhibits a high stability to temperature while the wear is low and the service life is acceptable.

7 Claims, 6 Drawing Sheets

BRAKE UNIT CONSISTING OF A BRAKE DISK AND A BRAKE LINING

BACKGROUND AND SUMMARY OF THE INVENTION

This application claims the priority of German Patent Document No. 197 27 586.9, filed Jun. 28, 1997, the disclosure of which is expressly incorporated by reference herein.

The present invention relates to a brake unit comprising a brake disk made of a fiber-reinforced ceramic C/SiC composite, which can be produced from a C/C pre-body, and a brake lining that tribologically interacts with the ceramic C/SiC composite.

Brake disks of the above-mentioned type are known, for example, from German Patent Document DE 44 38 455. Another fiber-reinforced ceramic composite is described in German Patent Application 197 11 829.1, which is a prior publication.

A fiber-reinforced ceramic C/SiC composite has high temperature stability and can therefore be very highly thermally stressed. It therefore presents a problem to find a suitable brake lining that can also be thermally stressed and is sufficiently resistant to wear. Because of the high temperatures occurring in the contact area, the use of conventional brake linings with an organic binder system or of conventional inorganically bound brake linings is particularly difficult.

It is therefore an object of the present invention to provide a brake unit of the above-mentioned type that has a sufficient service life and wherein the braking action is acceptable.

According to the present invention, the brake lining is made of a fiber-reinforced ceramic C/SiC composite and can be produced from a C/C pre-body, whose density, before silicating, at least in the area close to the surface, is higher than the density of the C/C pre-body of the brake disk.

The material of the brake lining is therefore basically the same material of which the brake disk is made. The production of the material is known to a person skilled in the art, for example, from German Patent Document DE 197 11 829.1. First, carbon fibers are mixed with a carbon precursor, for example, pyrolizable synthetic materials and optionally additional substances and are pressed to form a pre-body, the so-called "green compact". The green compact is subjected to a pyrolysis, in which the synthetic materials change to pyrolysis carbon. This results in a porous C/C pre-body. The C/C pre-body is finally infiltrated with liquid silicon and is heat-treated. This results in a ceramic, carbon-fiber-reinforced C/SiC body.

The larger and/or the more numerous the pores, the lower the density of this pre-body. Vice-versa, the smaller the pores and/or the lower their number, the higher the density of the pre-body. Consequently, if the fraction of silicon or silicon carbide in the C/SiC body will be larger, the more porous the C/C pre-body; that is, the lower its density had been. The silicon fraction and its distribution can therefore be influenced and controlled by way of the density of the pre-body.

The C/SiC brake disk is therefore paired with a brake lining which is of the same type of material, but is less hard. The lower hardness is the result of the lower silicon or silicon carbide fraction, which is lower than in the brake disk. The ceramic fraction is therefore lower and the carbon fraction is higher. The brake lining is therefore softer than the brake disk. It surprisingly exhibits a considerably longer service life and lower rates of wear than a lining of the same type that has approximately the same hardness.

The lower hardness of the lining is therefore achieved by a higher density of the C/C pre-body. This density, in turn, is generated by a lower pore volume of the C/C pre-body which is to be infiltrated with liquid silicon. Because of the low open pore fraction, the silicon carbide fraction in the ceramized brake lining is relatively small and finely distributed, and the carbon fraction is relatively high. Low porosity results in fewer and finer pore channels into which the silicon can penetrate.

The resulting ceramic material exhibits a behavior that is similar to that of the C/C material; it is softer than the ceramic composite. The carbon causes the hardness, which is lower in comparison to completely ceramic silicon carbide bodies, and the mechanical adaptability of the brake lining with respect to the micro form of the irregularities of the brake disk surface. The remaining silicon carbide content causes a higher resistance to wear and thermal stressability of the brake lining.

In contrast, in the case of the brake disks, a C/C pre-body is provided that has a lower density and a higher porosity in comparison to the pre-body of the brake lining. The liquid silicon can enter through many small pores so that finally the silicon fraction will be high and the resulting ceramic material will have a comparatively high density.

The brake lining therefore consists of a fiber-reinforced ceramic material that has a tribologically optimized behavior which is adjusted to the brake disk in a targeted manner. It exhibits low wear, a high service life, a high damage tolerance and mainly a surprisingly high coefficient of friction. The high coefficient of friction has the result that the pressure to be exercised during a braking maneuver can be reduced. The wear is therefore reduced again. In addition, it is possible to make the brake power assist units smaller. This saves weight which, in turn, can lower the fuel consumption.

It is particularly advantageous to achieve a microscopically homogeneous material structure with uniform characteristics.

With respect to its characteristics, the brake unit according to the present invention can be individually adapted to the respective requirements. If it is found, for example, that the C/SiC brake disk has a wear that is too high for a special application, the fraction of silicon carbide in the disk can be lowered. Inversely, in the pertaining lining, the silicon carbide fraction should then be increased in order to ensure an optimal braking action, a high service life and a low wear. The hardness of the brake disk and the hardness of the brake lining can therefore be optimally adjusted to one another so that the whole brake unit will have a high service life while the wear is low. "Optimally" means, for example, that the brake disk has a wear that can hardly be measured and the brake linings exhibit a wear behavior that can be compared with that of conventional brake linings.

Advantageously, the porosity of the C/C pre-body of the brake lining is at least in the area close to the surface approximately 20 to 30% lower than the porosity of the C/C pre-body of the brake disk. A preferred value for the density of the pre-body of the brake lining in the area close to the surface amounts to approximately 1.2–1.5 g/cm$^3$, preferably 1.3 g/cm$^3$.

Advantageously, the brake lining and/or the brake disk consist of a material whose fibers are essentially isotropically oriented. As a result, a uniformly high thermal conductivity can be achieved transversely to the braking surface of the brake disk and the brake lining. This results in a lowering of the surface temperature in the case of stress. Excessive surface temperatures may lead to an excessive heating of the brake fluid.

Since disturbing noises can occur during a braking maneuver by means of ceramic brake disks and ceramic brake linings, it is advantageous to include so-called comfort stabilizers, such as Cu, $CaF_2$, $MoS_2$, and $SbS_3$.

With respect to the process according to the present invention, it is provided that, for the manufacturing of a brake lining made of fiber-reinforced C—SiC ceramic material, a carbon fiber body is produced which has a specific pore and/or capillary volume; this carbon fiber body is infiltrated by carbon and/or a carbon precursor; and by pyrolysis, a porous C/C pre-body is produced which, in turn, is infiltrated by liquid silicon, in which case the carbon is ceramized to silicon carbide at least in the area of the pores and capillaries close to the surface. The open pore and capillary volume of the C/C pre-body before the liquid silicating should be adjusted to maximally approximately 60% by volume, preferably approximately 40 to 50% by volume.

The adjustment is essentially influenced by the temperature during the pressing of the green compact, the applied pressing pressure and the used raw materials. The higher the pressing pressure, the higher the density of the resulting green compact, the lower the porosity of the C/C pre-body and the softer the resulting ceramic body. Another possibility of adjusting the capillary volume consists of entering the carbon precursor by means of resin transfer molding; that is, to act upon it by means of a certain pressure, charge it into the fiber body; and simultaneously evacuate the pores and capillaries of the carbon fiber body. A defined capillary size is reached according to the adjustment of the pressure or of the vacuum. The thus obtained green compact is then pyrolized.

If no liquid carbon precursor is selected but a solid binding agent, the adjustment can take place by means of the type of the mixing of the constituents during the manufacturing of the homogenate to be pressed. In particular, a powder or a paste of carbon particles can be doctored into the pores and capillaries. As the result, only areas close to the surface are changed into pyrolysis carbon and silicated in the next process step. The untreated surface areas and the interior remain as a C/C body.

Not only carbon powders, suspensions or pastes of carbon powders, graphite or pitch are suitable for being used as the carbon precursor, but also pyrolyzable polymers, such as vinyl resins or silicon-containing polymers, for example, from the group of polysilanes, polycarbosilanes, polyborosilazanes, polysilazanes, polycarbosilazanes and polyborocarbosilizanes.

Other objects, advantages and novel features of the present invention will become apparent from the following detailed description of the invention when considered in conjunction with the accompanying drawings.

DETAILED DESCRIPTION OF THE DRAWINGS

Figure 1:
FIG. 1 is a light-microscopical micrograph of a brake disk of a brake unit according to the present invention.

FIG. 1 is a view of the micrograph of a brake disk of approximately 35 to 45% by volume fibers, approximately 40 to 50% by volume SiC and maximally approximately 15% by volume silicon. The structure is homogeneous; the fibers are arranged isotropically. The density amounts to approximately 2.25 $g/cm^3$.

Figure 2:
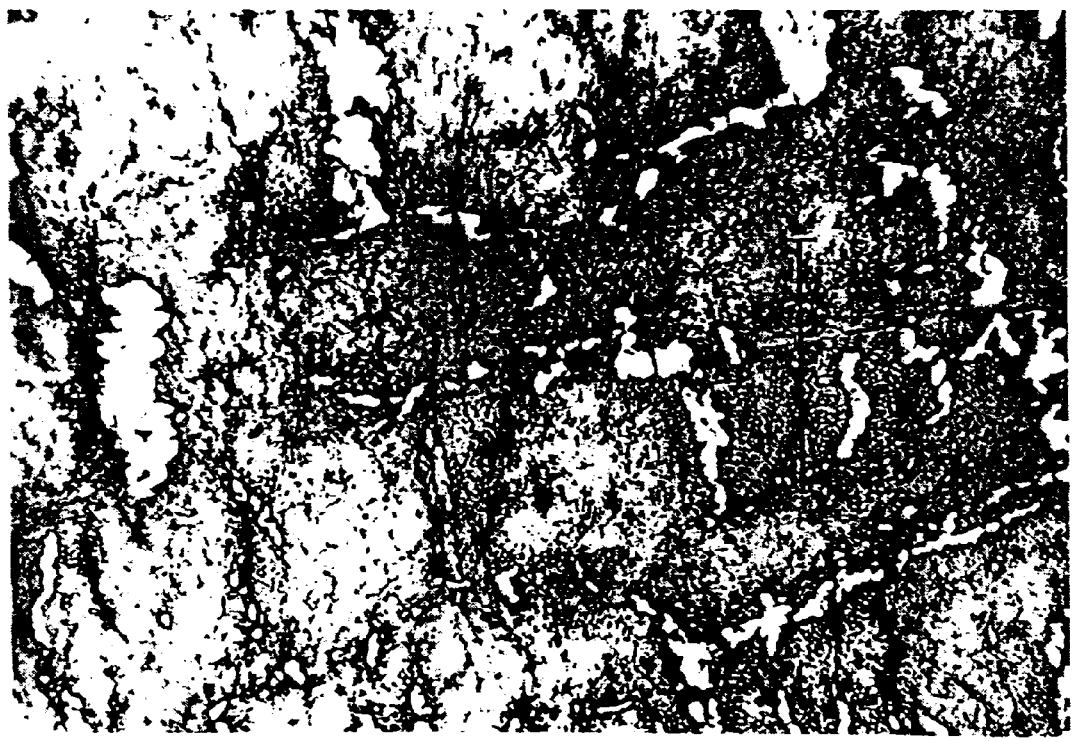
FIG. 2 is a light-microscopical micrograph of a brake lining with a high C/C content and a low SiC content.

FIG. 2 is a view of a C—SiC brake lining with a low SiC content. The density amounts to approximately 2.15 $g/cm^3$. For the manufacturing, a green compact made of carbon fibers, carbon precursor and additional substances is pressed at pressures above 100 bar.

Figure 3A:
FIGS. 3a, b are microsections in various directions of a C/C material, which is optimized with respect to the lining, before the silicating, specifically in the pressing direction (FIG. 3a) and perpendicularly to the pressing direction (FIG. 3b)
Figure 3B:

Another optimized brake lining is illustrated in FIGS. 3a and 3b. FIG. 3a very clearly shows the relatively small channels through which only a little silicon has entered. The fiber structure has been retained, and the C-fraction is high. FIG. 3b shows that the fibers are essentially isotropically distributed. The density of the material amounts to approximately 2.15 $g/cm^3$. The pressure during the pressing amounted to approximately 100 to 200 bar. In this case, the pore channels are pressed relatively tightly together.

Figure 4:
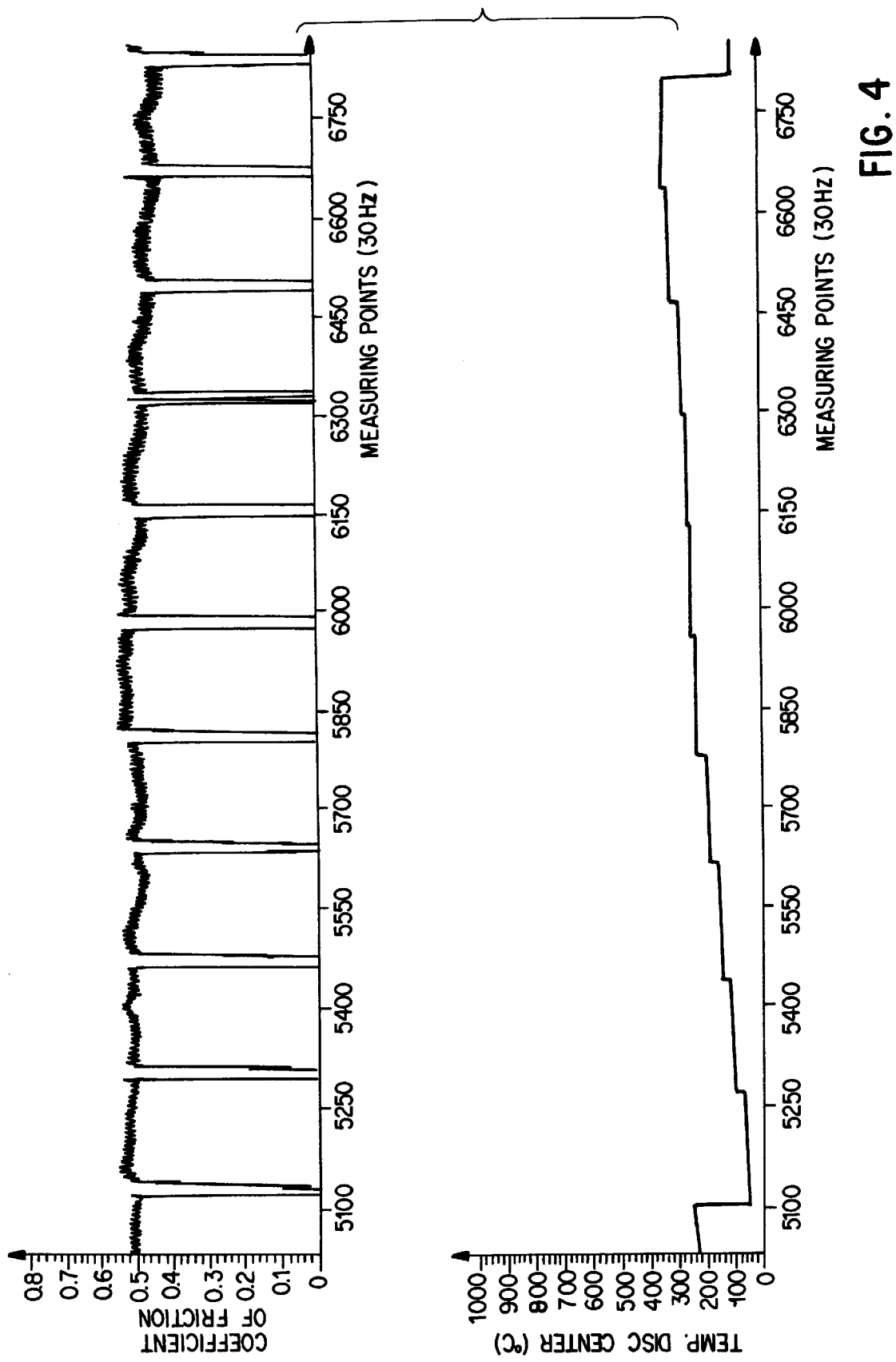
FIG. 4 is a view of results of braking tests by means of a brake unit according to the present invention.
Figure 5:
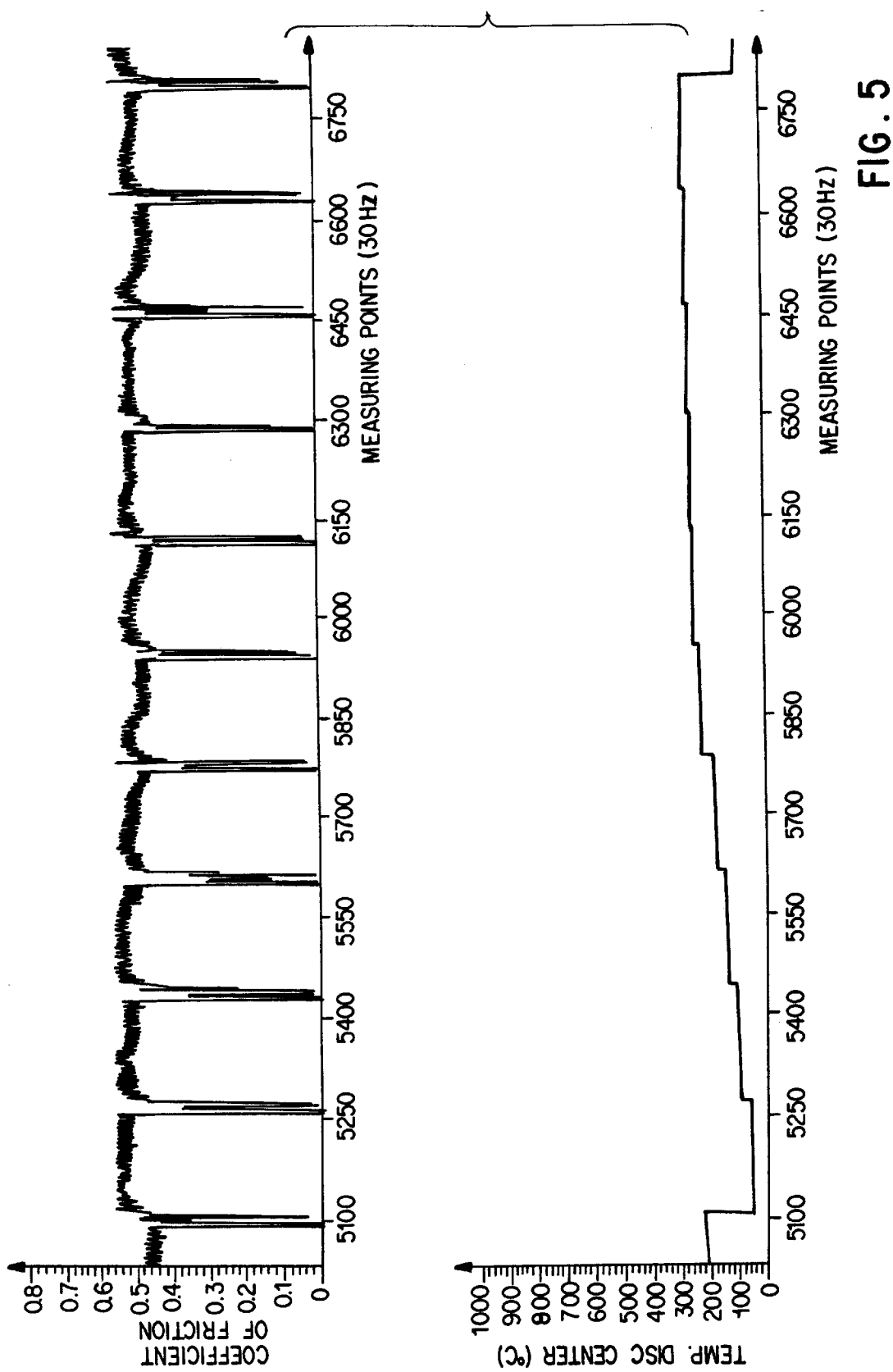
FIG. 5 is a view of results of braking tests by means of a C—SiC brake disk and a brake lining made of the same material.
Figure 6:
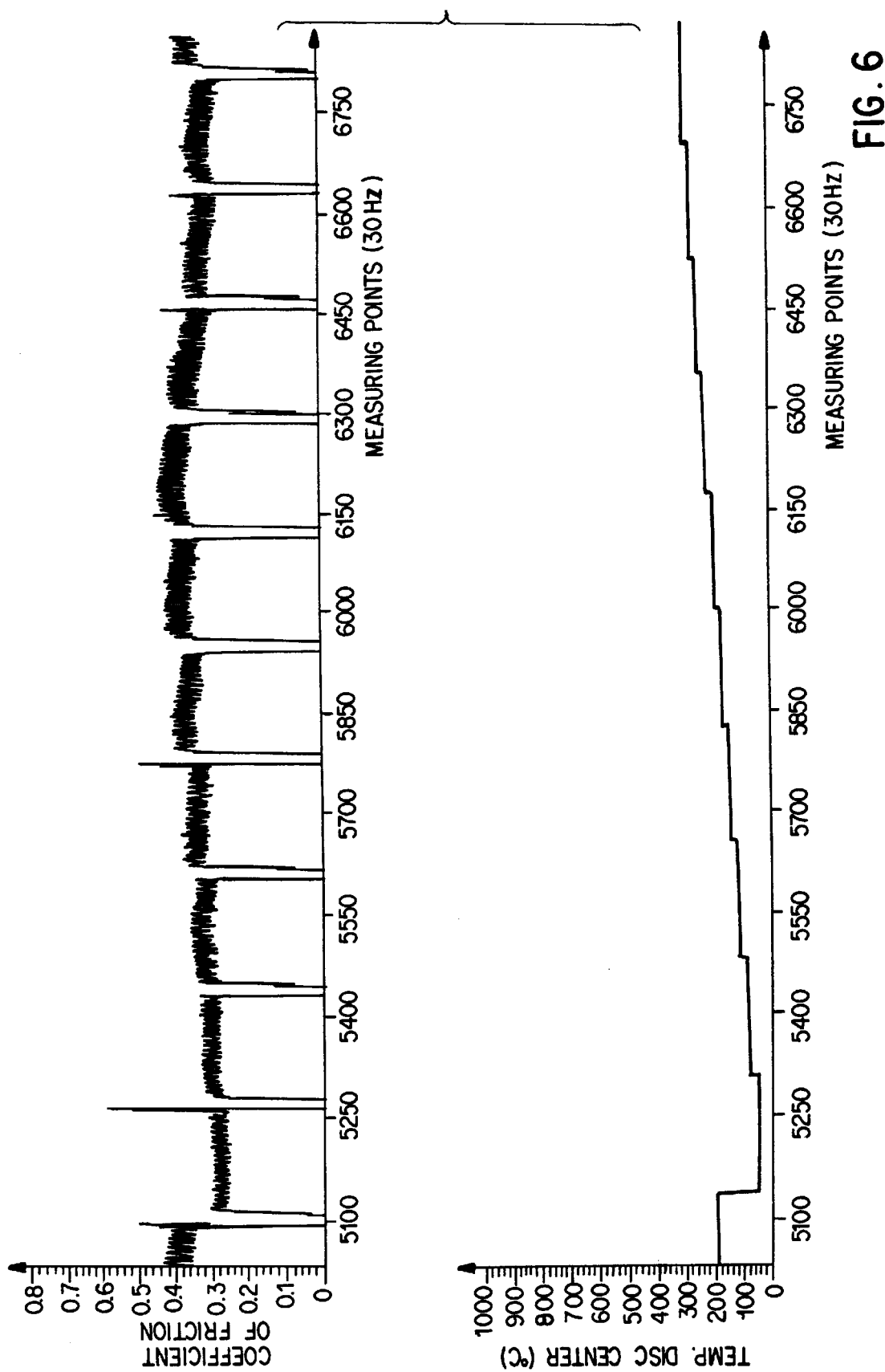
FIG. 6 is a view of results of braking tests by means of a C—SiC brake disk and a C/C brake lining.

FIGS. 4 to 6 show test stand measurements with different combinations of materials of the brake disk and the brake lining. FIG. 4 shows the results obtained by means of the lining illustrated in FIGS. 3a and 3b. In all measurements, a brake disk according to FIG. 1 was used, which has a diameter of 285 mm. The linings measured 80×65 mm and were thermally shrunk into metallic holding devices. The applied pressures amounted to 10–30 bar, at points up to 50 bar. The speeds were at 60–200 km/h. In the case of the brake unit according to the present invention, the measured coefficient of friction was above 0.5. The temperature in the disk center was below 400° C. The measured values exhibited a very good constancy as a function of the applied pressures and speeds. The constancy of the temperature was also very good. A fading could not be observed. The measured overall wear after the conclusion of the complete measuring program amounted to 0.05 mm in the case of the brake disk and 1 g in the case of the brake lining.

FIG. 5 shows the same measurement by means of a C/SiC brake disk and a C/SiC brake lining. The coefficient of friction was at a very good 0.6. The temperature in the disk center did not rise above 300° C. However, the wear data were unsatisfactory. In the case of the brake disk, the wear was 0.25 mm; in the case of the brake lining, 1.0 g. The hard and brittle brake lining causes a measurable abrasion on the brake disk. This is accompanied by a considerable loss of material in the case of the brake lining itself.

FIG. 6 shows another comparative measurement by means of a C/SiC brake disk and a C/C brake lining. Here, the coefficient of friction clearly was poorer. The brake disk exhibited no measurable wear. In the case of the brake lining, the loss of material amounted to 2.5 g. In this case, the brake lining is too soft in order to withstand the effect of the hard and brittle brake disk over time.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A brake unit, comprising:

a brake disk made of a fiber-reinforced ceramic C/SiC composite produced from a C/C pre-body, and a brake lining that tribologically interacts with the ceramic C/SiC composite, wherein the brake lining comprises a fiber-reinforced ceramic C/SiC composite produced from a C/C pre-body whose density before silicating is, at least in the area close to the surface, higher than the density of the C/C pre-body of the brake disk.

2. The brake unit according to claim 1, wherein the porosity of the C/C pre-body for the brake lining, at least in the area close to the surface, is approximately 20 to 30% lower than the porosity of the C/C pre-body for the brake disk.

3. The brake unit according to claim 1, wherein the density of the C/C pre-body for the brake lining, at least in the area close to the surface, is approximately 1.2 to 1.5 $g/cm^3$.

4. The brake unit according to claim 3, wherein the density of the C/C pre-body for the brake lining is approximately 1.3 $g/cm^3$.

5. The brake unit according claim 1, wherein at least one of the brake disk and the brake lining consist of a fiber-reinforced ceramic C/SiC composite whose fibers are essentially isotropically oriented.

6. The brake unit according to claim 1, wherein a green compact used for producing at least one of the brake disk and the brake lining has at least one of a microscopically homogeneous material structure and finely distributed small pores and channels.

7. A brake lining comprising a fiber-reinforced ceramic C/SiC composite produced from a C/C pre-body whose density before silicating is, at least in the area close to the surface, higher than a density of a C/C pre-body of a fiber-reinforced ceramic C/SiC composite brake disk.

* * * * *